US008074162B1

(12) United States Patent
Cohen

(10) Patent No.: US 8,074,162 B1
(45) Date of Patent: Dec. 6, 2011

(54) METHOD AND SYSTEM FOR VERIFYING THE APPROPRIATENESS OF SHARED CONTENT

(75) Inventor: Gabriel Cohen, San Mateo, CA (US)

(73) Assignee: Google Inc., Mountain View, CA (US)

( * ) Notice: Subject to any disclaimer, the term of this patent is extended or adjusted under 35 U.S.C. 154(b) by 842 days.

(21) Appl. No.: 11/877,384

(22) Filed: Oct. 23, 2007

(51) Int. Cl.
*G06F 17/22* (2006.01)

(52) U.S. Cl. ........................................................ 715/207

(58) Field of Classification Search .................. 715/206, 715/207
See application file for complete search history.

(56) References Cited

U.S. PATENT DOCUMENTS

| | | | | |
|---|---|---|---|---|
| 5,761,683 | A * | 6/1998 | Logan et al. | 715/206 |
| 5,937,404 | A * | 8/1999 | Csaszar et al. | 1/1 |
| 6,493,744 | B1 * | 12/2002 | Emens et al. | 709/203 |
| 6,895,111 | B1 * | 5/2005 | Swift | 382/165 |
| 7,155,489 | B1 * | 12/2006 | Heilbron et al. | 709/217 |
| 7,757,002 | B2 * | 7/2010 | Penton et al. | 709/246 |
| 2001/0033297 | A1 * | 10/2001 | Shastri et al. | 345/741 |
| 2003/0030645 | A1 * | 2/2003 | Ribak et al. | 345/581 |
| 2005/0050222 | A1 * | 3/2005 | Packer | 709/238 |
| 2005/0071748 | A1 * | 3/2005 | Shipp | 715/501.1 |
| 2005/0102407 | A1 * | 5/2005 | Clapper | 709/228 |
| 2006/0101514 | A1 * | 5/2006 | Milener et al. | 726/22 |
| 2006/0129644 | A1 * | 6/2006 | Owen et al. | 709/206 |
| 2006/0271631 | A1 * | 11/2006 | Qureshi et al. | 709/206 |
| 2007/0043815 | A1 * | 2/2007 | Tsang et al. | 709/206 |
| 2007/0195779 | A1 * | 8/2007 | Judge et al. | 370/392 |
| 2007/0214263 | A1 * | 9/2007 | Fraisse et al. | 709/225 |
| 2008/0256187 | A1 * | 10/2008 | Kay | 709/206 |
| 2008/0301802 | A1 * | 12/2008 | Bates et al. | 726/16 |

OTHER PUBLICATIONS

Leavitt, Instant Messaging: A New Target for Hackers, IEEE, Computer vol. 38 Issue.7, Jul. 2005, p. 20-23.*
Chen et al., Online Detection and Prevention of Phishing Attacks, IEEE, ChinaCom '06, First International Conference on Communications and Networking in China, Oct. 2006, p. 1-7.*
Wikipedia, "Content-Control Software," Dec. 25, 2007. Downloaded from http://en.wikipedia.org/wiki/Content-control_software on Jan. 2, 2008, 6 pages.
Wikipedia, "Blacklist," *Computing* section, Dec. 22, 2007. Downloaded from http://en.wikipedia.org/wiki/Blacklist on Jan. 2, 2008, 4 pages.
Wikipedia, "Whitelist," Dec. 15, 2007. Downloaded from http://en.wikipedia.org/wiki/Whitelist on Jan. 2, 2008, 3 pages.

* cited by examiner

*Primary Examiner* — Laurie Ries
*Assistant Examiner* — Frank D Mills
(74) *Attorney, Agent, or Firm* — Sterne, Kessler, Goldstein & Fox PLLC

(57) ABSTRACT

The present invention relates to systems and methods for verifying the appropriateness of shared content. In a first embodiment, a system displays a link to a site addressable by an identifier. The system includes an indexer that determines a content type for the site. A link displayer displays a link to the site, wherein the displayed link has a graphical presentation associated with the content type. In a second embodiment, a method displays a link to a site addressable by an identifier. The method includes the steps of: (a) determining a content type for the site; and (b) displaying a link to the site, the link having a graphical presentation associated with the content type.

19 Claims, 6 Drawing Sheets

METHOD AND SYSTEM FOR VERIFYING THE APPROPRIATENESS OF SHARED CONTENT

BACKGROUND OF THE INVENTION

1. Field of the Invention

This invention relates to content delivery over a network.

2. Background Art

Applications such as instant messenger (IM) and email allow users to share messages with other users over one or more networks, such as the Internet. A message may contain an identifier, such as a uniform resource locator. The identifier may address content across the network, including HTML, pictures, and video. An application may display a link to the content within the message. When selected, the link automatically opens the content without regard for appropriateness.

Unfortunately, some content may be inappropriate. This can be especially troublesome when content is shared between users over a network. For example, two users may communicate using an IM or email application. One of the users (the sender) may send a message with a link pointing to content that is inappropriate to view at work. Unaware of the content, the other user (the receiver) may select the link, inadvertently directing the user to the inappropriate content. To deal with this, the sender may first annotate the link with a message such as "nsfw—not safe for work". However, this approach requires that the sender follow an etiquette and be aware of the recipient's sensitivities.

In another example, a sender may send a message having a link pointing to content that is inappropriate for children. Parental control software may block access to content addressed by the link. For example, parental control software may specify a web site blacklist or whitelist. The blacklist establishes a list of identifiers to block, whereas the whitelist establishes a list of identifiers to allow. This approach is limited as the identifier may not be a good indicator of the underlying content.

Methods and systems are needed to improve existing screening techniques.

BRIEF SUMMARY OF THE INVENTION

The present invention relates to systems and methods for verifying the appropriateness of shared content. In a first embodiment, a system displays a link to a site addressable by an identifier. The system includes an indexer that determines a content type for the site. A link displayer displays a link to the site, wherein the displayed link has a graphical presentation associated with the content type.

In an example, the indexer may determine a content type associated with the site based on predetermined content type information associated with different sites. For instance, the indexer could perform a lookup of a table to identify a content type associated with the particular site.

According to a further feature, if the content type of a site is unknown, then the indexer may analyze the content of the site to determine a content type. This determined content type for the site can also be added to a table of known content types and sites to increase the number of sites with predetermined content type information and avoid repeating expensive content analysis.

In a second embodiment, a method displays a link to a site addressable by an identifier. The method includes the steps of: (a) determining a content type for the site; and (b) displaying a link to the site, the link having a graphical presentation associated with the content type.

In one example, determining a content type for a site can include determining a content type from predetermined content type information, such as a table having sites and associated content type information. In a further feature, determining content type can further include analyzing content at the site to determine its content type. In one example, such content analysis of a site can be performed when a content type is not known from predetermined content type information.

In this way, links are screened automatically based on the content of the site that the link's identifier addresses. The appropriateness of a site's contents is verified before the receiving user selects a link to that site. If the site is inappropriate, the link may be blocked, protecting users (e.g., children) from inappropriate links. In addition, the user may receive an indication of the site's contents, informing the user's decision on whether to select the link.

Further embodiments, features, and advantages of the invention, as well as the structure and operation of the various embodiments of the invention are described in detail below with reference to accompanying drawings.

BRIEF DESCRIPTION OF THE FIGURES

The accompanying drawings, which are incorporated herein and form a part of the specification, illustrate the present invention and, together with the description, further serve to explain the principles of the invention and to enable a person skilled in the pertinent art to make and to use the invention.

Embodiments of the invention are described with reference to the accompanying drawings. In the drawings, like reference numbers may indicate identical or functionally similar elements.

DETAILED DESCRIPTION OF EMBODIMENTS

Figure 1:
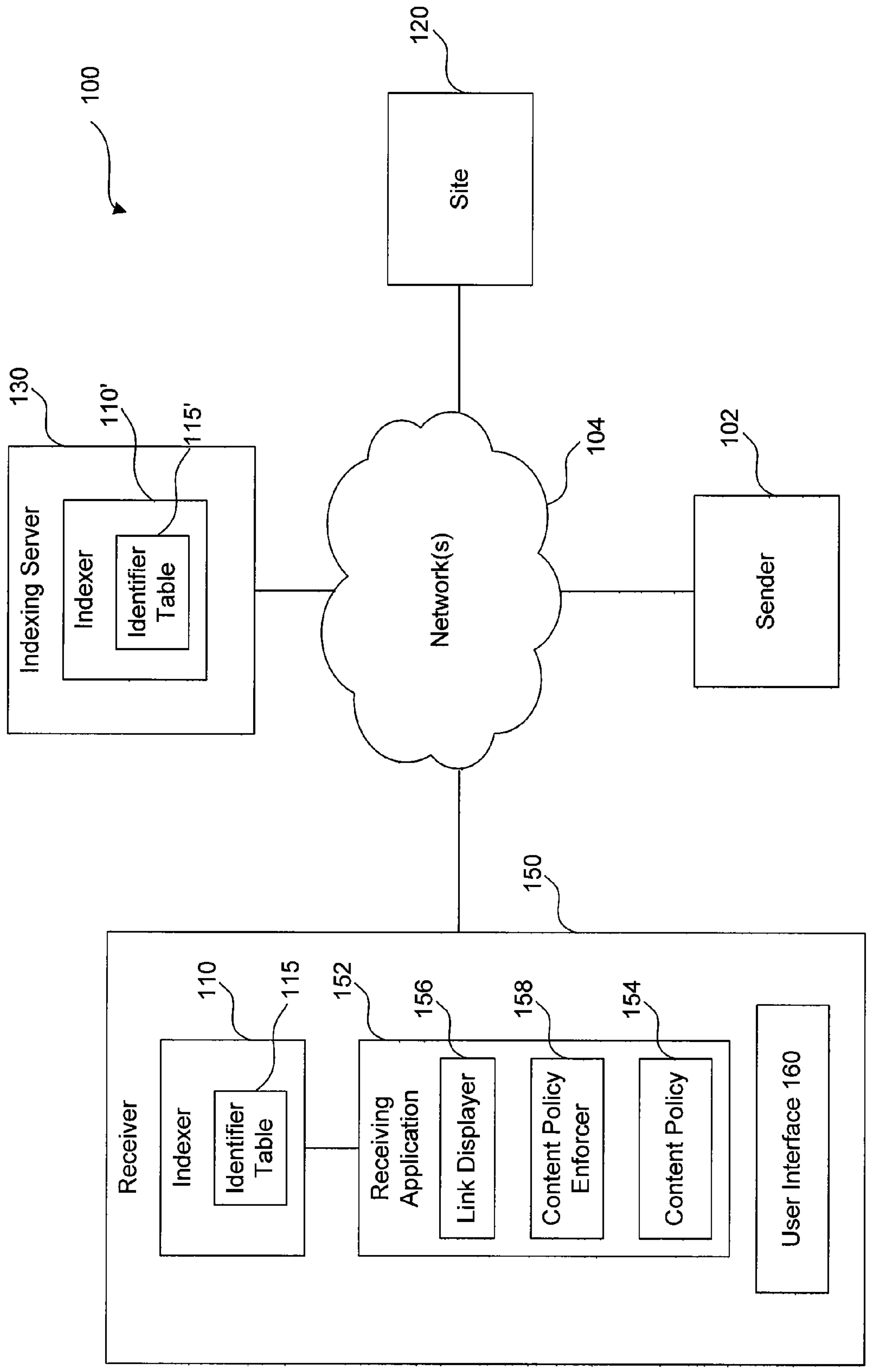
FIG. 1 is an architecture diagram of a system according to an embodiment of the present invention.

The present invention relates to systems and methods for verifying the appropriateness of network content. In embodiments, this includes verifying the appropriateness of content shared between users communicating over a network through instant messaging, email, of other types of messaging. Links sent to users are screened automatically based on the content that the link's identifier addresses. Using these embodiments, the appropriateness of a site's contents may be verified before the user selects a link to the site. As a result, users can better block content that may be, for example, inappropriate for children and will be less likely to open content when it would be inappropriate to view.

In the detailed description of embodiments herein, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

The term "identifier" used herein refers to a content address. An example of an identifier is a uniform resource locator (URL). URLs may address content stored locally or across one or more networks, such as the Internet. Another example of an identifier is a filename. These examples are illustrative and are not intended to limit the definition.

The term "link" used herein refers to a selectable item including an identifier and any kind of button, selector, or other type of user interface control element that can load content. In one example, selecting the link may load content addressed by an identifier in the same window. In another example, selecting the link may load content addressed by an identifier in a new window. These examples are illustrative and are not intended to limit the definition.

The term "inappropriate" is meant broadly to refer to content considered to be insecure, undesirable, unsafe, adult, malicious, suspicious, or otherwise unwanted. In an example, inappropriate content may also be political or religious content that may be undesirable in particular contexts, such as, at work.

This detailed description of embodiments is divided into sections. First, this detailed description describes a system architecture according to an embodiment of the invention. Second, this detailed description describes an example user interface display of a receiving application component of the system. Finally, this detailed description describes a method according to an embodiment of the invention, which the system described earlier may use in its operation.

System

This section describes a system according to an embodiment of this invention. First, the various system components are described with respect to FIG. 1. Second, how those system components may communicate is described with respect to FIGS. 2A-B.

FIG. 1 is a diagram of system 100 according to an embodiment of the present invention. System 100 includes various components, which may communicate over network(s) 104, such as the Internet. System 100 includes sender 102, receiver 150, site 120, and indexing server 130. Each of those system components may include any computing device that can communicate over a network. Example computing devices, include, but are not limited to, a computer, workstation, distributed computing system, embedded system, stand-alone electronic device, networked device, mobile device, rack server, television, or other type of computer system.

Network(s) 104 can be any network or combination of networks that can carry data communication, and may be referred to herein as a computer network. Such network(s) 104 can include, but is not limited to, a local area network, medium area network, and/or wide area network such as the Internet. Network(s) 104 can support protocols and technology including, but not limited to, World Wide Web protocols and/or services. Intermediate web servers, gateways, or other servers may be provided between components of system 100 depending upon a particular application or environment.

Site 120 represents an addressable location delivering content. As an example not meant to limit the invention, site 120 may include a web server. A web server is a software component that responds to a hypertext transfer protocol (HTTP) request with an HTTP reply. As illustrative examples, the web server may be, without limitation, APACHE HTTP Server, APACHE Tomcat, MICROSOFT Internet Information Server, JBOSS Application Server, WEBLOGIC Application Server, or SUN JAVA System Web Server. The web server may serve content such as hypertext markup language (HTML), extendable markup language (XML), documents, videos, images, multimedia features, or any combination thereof. This example is strictly illustrative and does not limit the present invention.

Sender 102 sends data to receiver 150 through, for example, network 104. As an example, sender 102 may contain an application. The application may be, for example, an IM or email client. The application may be implemented in software, hardware, firmware, or any combination thereof.

Receiver 150 includes a receiving application 152 and a user interface 160. Receiver 150 may also include indexer 110. Receiver 150 receives data from sender 102. User interface 160 that allows the user to interact with receiver 150. User interface 160 contains a user interface display that displays data to the user. As an illustrative example, the user interface display may be a computer screen. User interface 160 also has a mechanism for the user to interact with components of receiver 150. For example, user interface 160 may have a mouse that allows the user to make a selection on the user interface display. In another example, user interface 160 may allow the user to make a selection using a keyboard or touch screen. These examples are merely illustrative and are not intended to limit the invention.

Receiver 150 includes a receiving application 152. As an illustrative example, receiving application 152 may be an IM or email client. Receiving application 152 may include a link displayer 156, a content policy enforcer 158, and a content policy 154.

Content policy 154 describes a policy which receiving application 152 may use to screen links. Content policy 154 may be a data structure stored in memory and may be configurable by a user. Authentication and authorization may be required to configure content policy 154.

Content policy 154 allows a user to configure how receiving application 152 displays a link in response to the content type of the site content that the link addresses. A local configuration allows the user to tailor the level of protection according to the user's preferences. For example, a user with children in the user's household may want a higher level of protection with more sites blocked than a user without children. The user may configure content policy 154 by, for example, selecting content types using user interface 160.

As an illustrative example, a parent could configure content policy 154 such that a link would not be displayed if its identifier addresses an adult site. This configuration would prevent a child from selecting the link and viewing the inappropriate content. The parent could also require authentication prior to configuring the content policy. Only authorized users (such as the parent) would have permission to change the configuration. This would prevent the child or others from turning off the safeguards.

In another example, a user could configure content policy 154 such that a warning would be displayed next to a link if the link's identifier addresses a site with offensive language. This would prevent the user from inadvertently linking to a site with offensive language when viewing the site would be inappropriate, for example at work. The above examples are illustrative and do not limit the present invention.

Other techniques screen a link based on the identifier the link addresses. In both the above examples, the information in content policy 154 is used in conjunction with information from indexer 110 (described below) which evaluates the site's content. By screening links based on the site's content, as opposed to merely the site's identifier, embodiments of this invention screen links more comprehensively, accurately, and securely.

Also within receiving application 152, content policy enforcer 158 interprets content policy 154 to determine how links should be displayed. Link displayer 156 displays links to the user according to that determination. Further examples are described below.

In a first embodiment, receiver 150 may also include indexer 110. In a second embodiment, indexer 110 may exist on a separate server. The second embodiment is shown as indexer 110' residing on an indexing server 130. Indexer 110 may communicate with site 120 to retrieve content and analyze the content to determine the content type. As an example without limitation, indexer 110 may be a software module. Indexer 110 may be a web application, such as a web service. In an embodiment where indexer 110 is located on receiver 150, indexer 110 may also be a component of receiving application 152 or may be running as an independent process on receiver 150. In another embodiment, indexer 110 could analyze some or all site content while indexing a site for a search engine. Indexer 110 may include identifier table 115. Identifier table 115 keeps track of identifiers with known content types. Table 115 is illustrative, and other data structures can be used.

Having indexer 110 on a separate indexing sever 130 is more secure. Some network administrators monitor network traffic for the identifiers addressed. When indexer 110 communicates with site 120 to retrieve content, indexer 110 sends a request addressed to the identifier over network 104. A network administrator or network administration tool may detect that the request was made. If the request is made from indexer 110 and indexer 110 resides on receiver 150, the network administrator may believe that the request was made by the user of receiver 150 attempting to view the potentially inappropriate content. However, if indexer 110 is on a separate indexing sever 130, it is clear to a network administrator that indexer 110 is making the request to verify the content's appropriateness, and it is not the user trying the view the content.

Figure 2A:
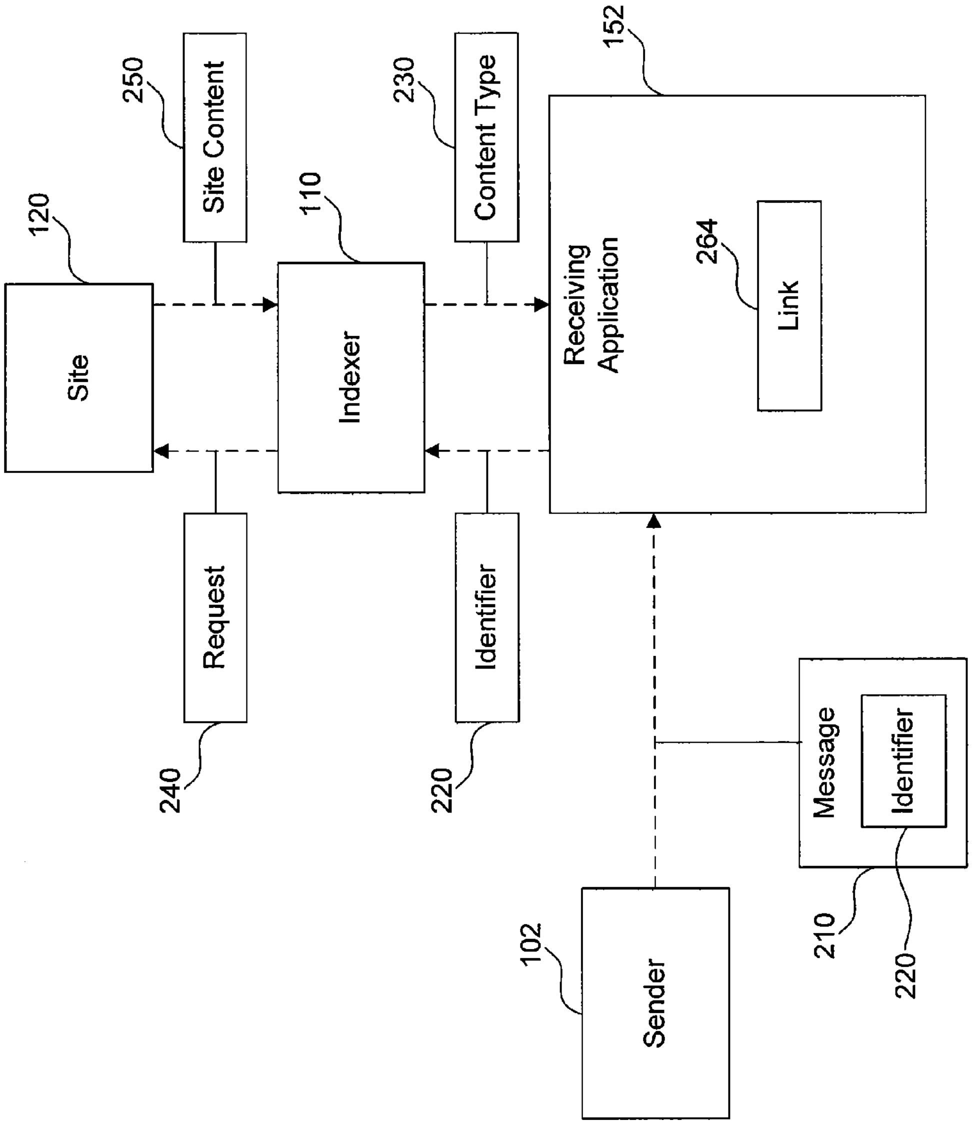
FIG. 2A illustrates how components of the system shown in FIG. 1 may communicate with each other, according to an embodiment of the present invention.

FIG. 2A illustrates how components of the system shown in FIG. 1 may communicate with each other in an embodiment of the present invention.

Sender 102 sends identifier 220 to receiving application 152. Identifier 220 may be contained within message 210. As illustrative examples, message 210 may be an IM message or email. Message 210 may be formatted as plain text or a markup language, such as HTML or XML. Identifier 220 may be embedded within the markup language as an element or a property of a tag. As an illustrative example, the message could read, in part, "<a href='www.myawesomesite.com'>Click Me</a>". In that example, the identifier, "www.myawesomesite.com", is a property of an HTML tag. Identifier 220 addresses site 120.

After receiving identifier 220, receiving application 152 may display link 264. When selected, link 264 may direct the user to the content addressed by identifier 220. Link 264 will be described in more detail herein.

In an embodiment, after receiving identifier 220, receiving application 152 sends identifier 220 to indexer 110. Indexer 110 makes a determination as to content type 230. Content type 230 is an indication of site 120's contents. Example content types include "adult", "graphic violence", "offensive language", "safe", or "unknown". Site 120 may also have multiple content types associated with it. In another example, content types could be part of a rating system. In such a rating system, one may mean that a site is appropriate, ten may mean that the site is highly inappropriate, and the numbers in between may form a sliding scale. These examples are illustrative and are not intended to limit the definition of content type.

To determine content type 230, indexer 110 may require the content of the site addressed by identifier 220, e.g. site 120. To obtain the required content, indexer 110 may send request 240 to site 120. Request 240 is a request for site 120's content. As an illustrative example, request 240 may be an HTTP request. Request 240 may or may not have parameters or post data. In response to request 240, site 120 delivers site content 250 back to indexer 110. As an illustrative example, site content 250 may be packaged as an HTTP response. Site content 250 may include HTML, XML, documents, videos, images, or any combination thereof. The above examples are strictly illustrative and do not limit the present invention.

In another embodiment, indexer 110 may not make request 240. Instead, indexer 110 may lookup a pre-determined content type from indexer table 115 shown in FIG. 1 according to identifier 220.

Once indexer 110 determines content type 230, which may involve requesting site content 250, indexer 110 returns content type 230 to receiving application 152. Receiving application 152 may display link 264 accordingly.

In this way, link 264 is screened automatically based on the content that the link's identifier addresses. The appropriateness of a site's contents is verified before the user selects a link to that site. If the site is inappropriate, the link may be blocked, for example, to protect children from inappropriate links. In addition, the user may receive an indication of the site's contents, informing the user's decision on whether to select the link.

Figure 2B:
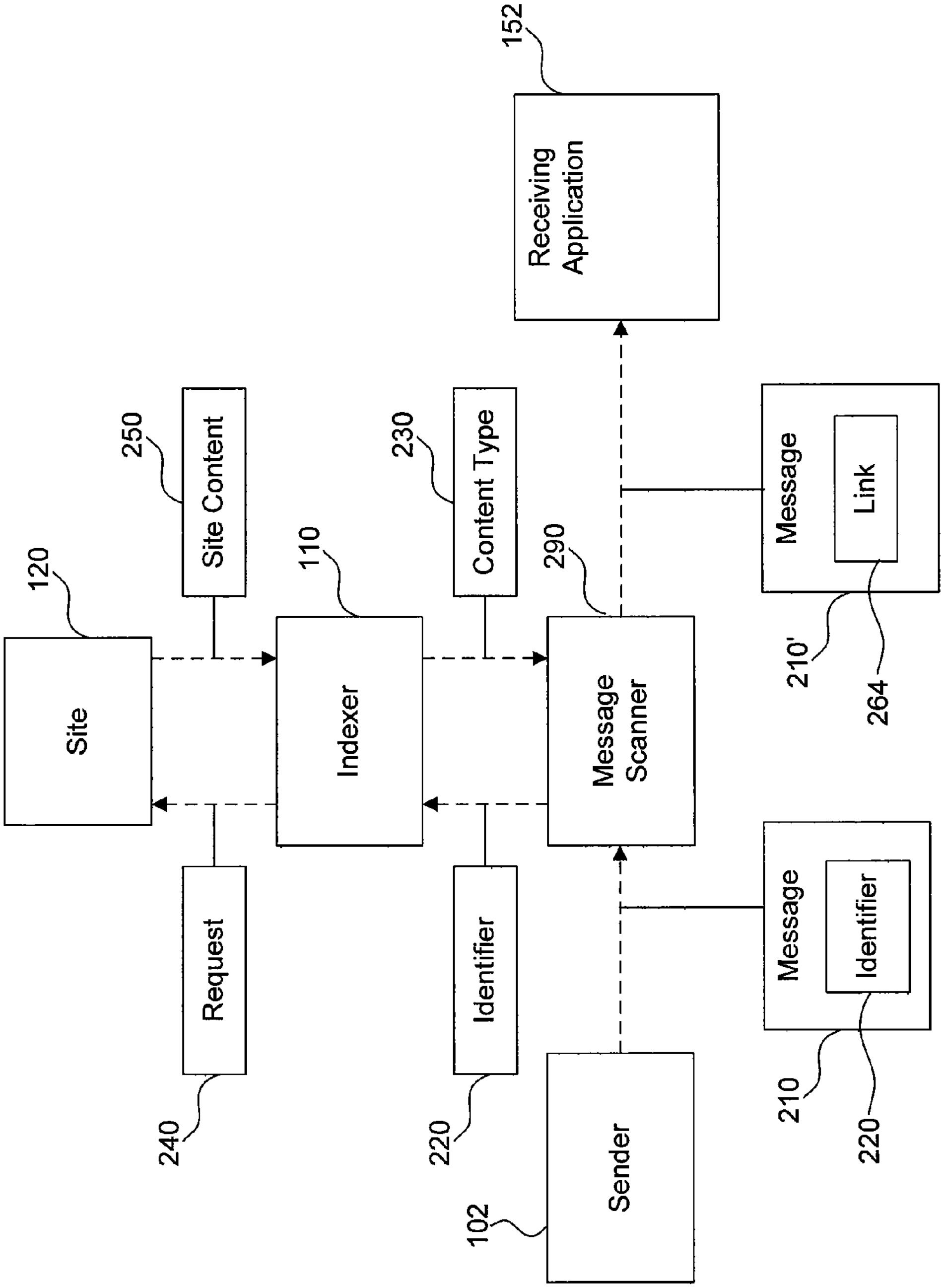
FIG. 2B illustrates a system with a message scanner according to a further embodiment of the present invention.

FIG. 2B illustrates an alternative configuration of the components of the system shown in FIG. 1. FIG. 2B includes a message scanner 290 coupled between sender 102 and receiving application 152. Message scanner 290 may receive message 210 before it passes to receiving application 152. Message scanner 290 may then send identifier 220 to indexer 110. Indexer 110 makes a determination as to content type 230, as discussed above. Message scanner 290 may present link 264 according to content type 230. Message scanner 290 may then send on a message 210' with link 264 to receiving application 152. In this way, message scanner 290 may help a user to screen traffic before it reaches receiving application 152.

Message scanner 290 may be located on a separate server (not shown) or on receiver 150. Message scanner 290 may be implemented on hardware, software, firmware or any combination thereof.

Example User Interface Display

Figure 3:
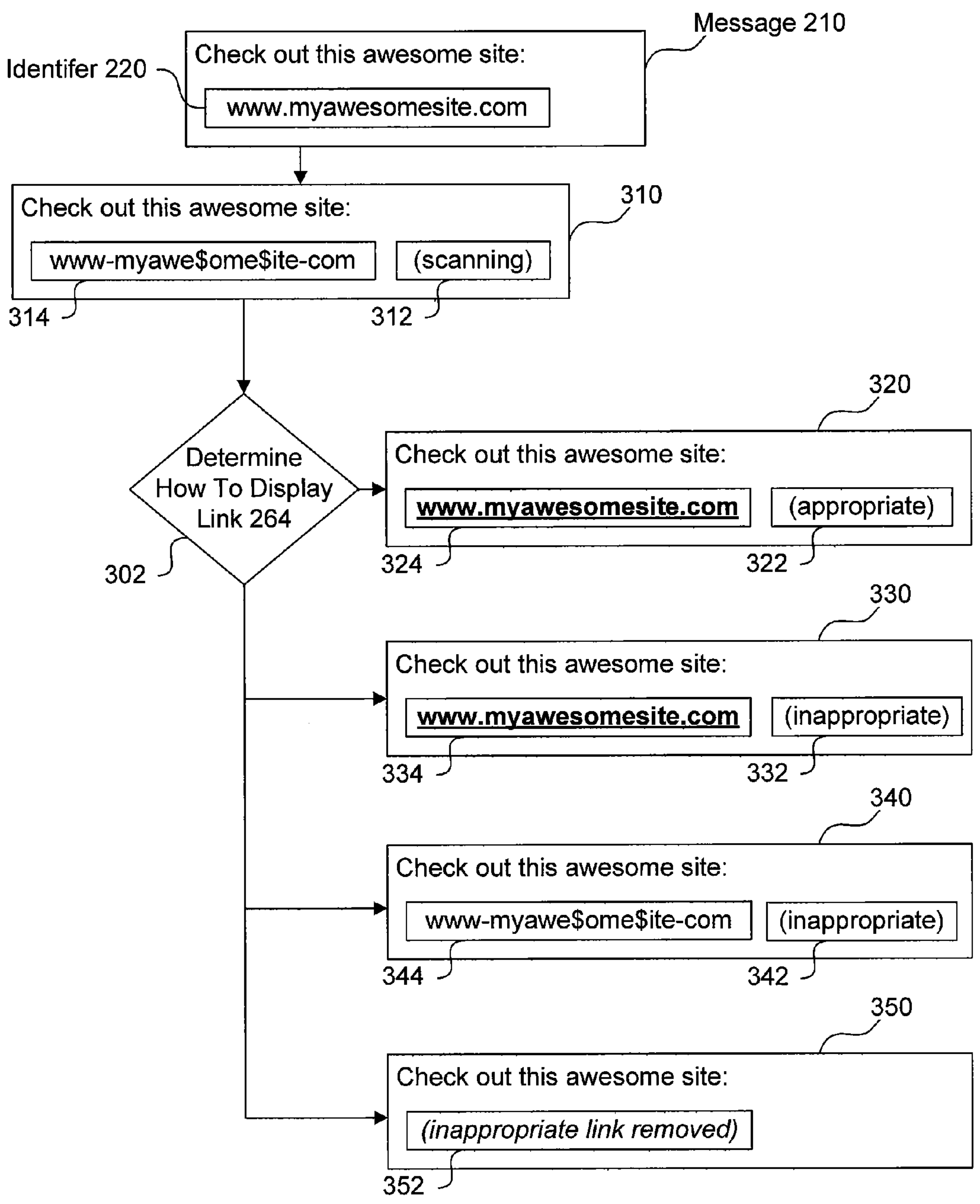
FIG. 3 is a flowchart illustrating an operation of an example user interface display of an exemplary receiving application component of the system.

FIG. 3 illustrates operation of an example user interface 160 of receiving application 152 of system 100.

Operation begins when a message, such as message 210, is received by, for example, receiving application 152. In this example, message 210 contains the phrase "Check out this awesome site: www.myawesomesite.com". Within the message, "www.myawesomesite.com" is identifier 220. Receiving application 152 displays identifier 220 as link 264 in FIG. 2A. In each of the examples shown in FIG. 3, link 264 is the selectable area surrounding the identifiers.

When receiving application 152 receives message 210, receiving application 152 may display message 310. At this point, any links in the message may be screened. How a link is screened is described in more detail below. The links in the message are presented based on the content type. Each of block 310, 320, 330, 340, 350 is an example presentation of link 264 in FIG. 2A. In the example at 310, link 264 is deactivated, meaning that selecting link 264 would not display new content. Also the example at 310 contains affordance 312 indicating link 264 is being screened. Affordance 312 is the text "(scanning)". Other affordances may be used.

At block 314, the identifier is garbled. In the above example, identifier 220, "www.myawesomesite.com", is garbled to "www-myawe$ome$ite-com". Garbling identifier 220 prevents the user from copying identifier 220 and pasting it into a browser window address field, which would direct the user to site 120. Garbling identifier 220 is optional. Alternatively, identifier 220 may not be displayed at all until after screening is complete. If identifier 220 is not displayed and link 264 is deactivated, the user would not be able to address site 120 at all until it has been determined to be appropriate.

After displaying message 310, the system determines how to display link 264. Several components working in concert may make this determination as will be discussed herein. Link displayer 156 displays link 264 based on this determination. FIG. 3 shows four examples of how link 264 may be displayed. These examples are illustrative and are not meant to limit the present invention. First, the example at block 320 has link 324 activated and accordance 322 indicating that the site content is appropriate. Second, the example at block 330 has link 334 activated and accordance 332 indicating that the site content is inappropriate. Third, the example at block 340 has link 344 deactivated and accordance 342 indicating that the site content is inappropriate. Also, the identifier at block 344 remains garbled. Fourth, the example at block 350 has accordance 352 indicating that the site content is inappropriate and the link has been removed.

These example shows how link screening may operate at the user interface display of the receiving application display. The link may be deactivated or garbled until the appropriateness of the site's content is verified. If the site is inappropriate, the link may be blocked. In addition, the user may receive an indication of the site's contents, informing the user's decision on whether to select the link.

Operation

In this section, a method is described to determine how to display a link. For clarity, the method is described with respect to the system in FIG. 1. However, this is not intended to limit the method to the system.

Figure 4:
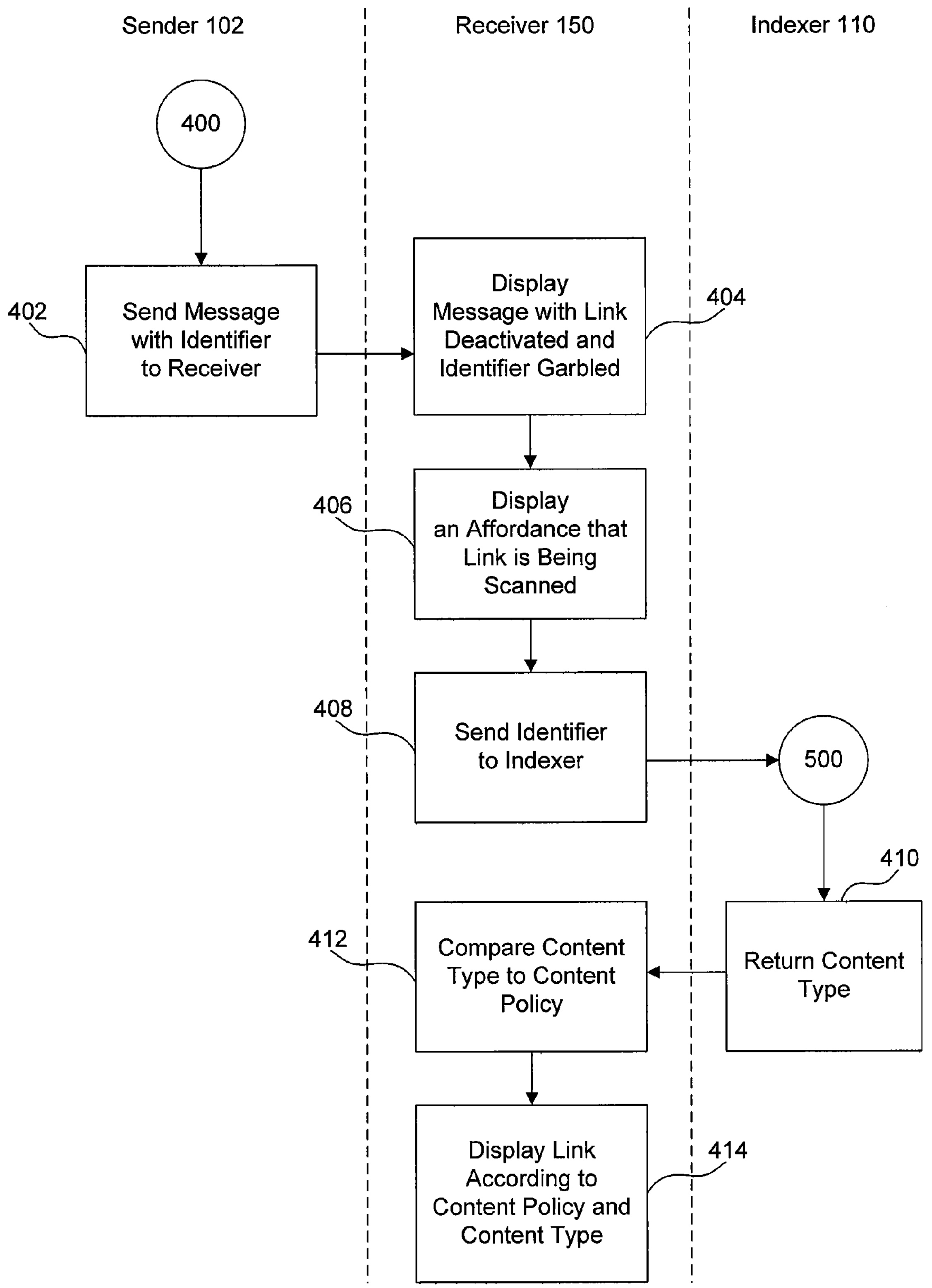
FIGS. 4 and 5 are flowcharts illustrating a method of displaying links according to an embodiment of this invention, which the system in FIG. 1 may use in operation.
Figure 5:
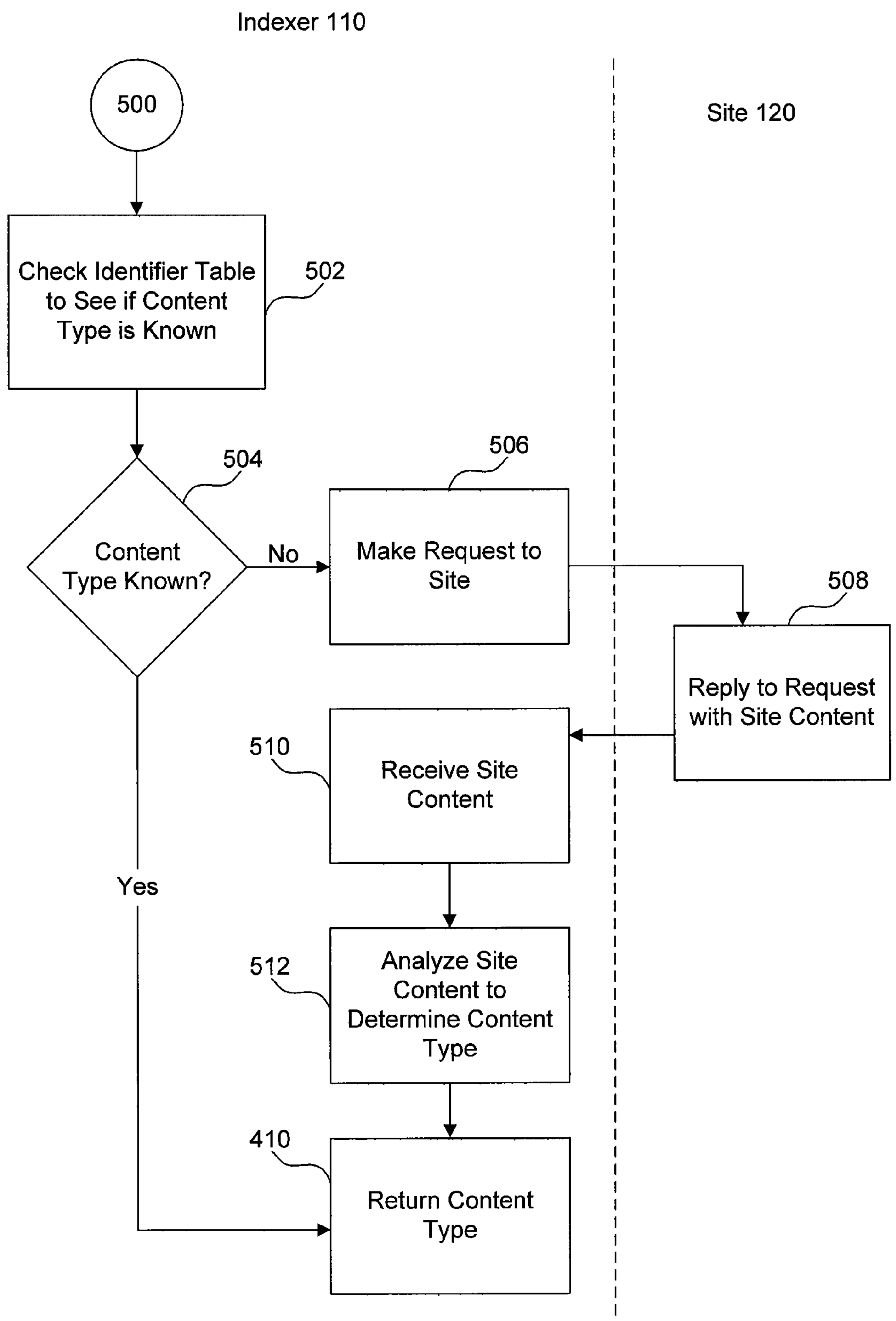

FIGS. 4 and 5 are flowcharts illustrating the operation of the components shown in FIG. 1 in an embodiment of the present invention. FIG. 4 is divided into three columns, each column including actions taken by a respective one of sender 102, receiver 150, indexer 110, according to an embodiment of the present invention.

Routine 400 illustrates how a link may be displayed based on its content type, according to an embodiment of the present invention. Routine 400 begins at step 402 when an identifier is sent to a recipient. The identifier may be contained within a message. As an example, identifier 220 may be sent by sender 102 to receiver 150 in message 210. At step 404, the message is displayed with a link deactivated and the identifier garbled. As mentioned earlier, step 404 is optional. As an alternative, the identifier may be hidden until the content it addresses is found appropriate (step not shown). At step 406, an affordance is displayed to indicate that the link is being scanned. For example, affordance 312 may be displayed by receiver 150. At step 408, the identifier is sent to an indexer. The identifier may be sent by, for example, receiver 150. As discussed earlier, the indexer may be part of the receiver (such as indexer 110) or may be on a separate indexing server (such as indexer 110'). Once the identifier has been received by the indexer, routine 500 is executed.

FIG. 5 further details routine 500. In routine 500, the content type is determined. Routine 500 starts at step 502. At step 502, it is determined whether the content type is known for the identifier. In the example of FIG. 1, indexer 110 may check identifier table 115 to see if content type 230 is known for identifier 220. At step 504, if the content type is known, the indexer returns the content type at step 410. The content type may be returned to, for example, receiver 150. If the content type is not known, control proceeds to step 506.

In another embodiment, the indexer may not store content types in, for example, an identifier table. In that embodiment, the indexer would not execute step 502 and step 504. Instead, when the indexer receives the identifier, the indexer immediately proceeds to step 506.

At steps 506 through 510, the indexer communicates with a site, such as site 120, to retrieve a site content. At step 506, the indexer makes a request for the site content. The request may be made to the site directly or indirectly. At step 508, the site replies to the request with the site content. The indexer receives the site content at step 510. As an illustrative example, the site may be a web server. In that example, the request may be an HTTP request. The site may have to do some processing to generate to the site content. Example processing could include querying a database, executing a script, or making other HTTP requests. The site content may be packaged in an HTTP reply. As illustrative examples, the site content may be HTML, images, text, video, or multimedia content.

In an embodiment not shown, the indexer may need to make additional requests. As an example, the site content may contain HTML frames with links to other sites. In that example, requests can be made to the other sites to assemble all the content necessary to determine the content type.

At step 512, the site content is analyzed to determine the content type. For example, indexer 110 may analyze site content 250 to determine content type 230. This analysis can take a variety of forms. In an example, not meant to limit the present invention, step 512 may include a dirty-word search. The keyword search may search the site content for offensive words. However, a mere keyword search would be ineffective at recognizing obscene material outside the text or markup, for example in an image or video. In a second example, step 512 may include a computer vision algorithm that recognizes inappropriate content. A computer vision algorithm may render the content and search for inappropriate content in the rendered content. In a third example, step 512 may include probabilistic inferential learning, semantic analysis, or textual analysis to interpret the meaning of the content and identify an associated content type. This example may distinguish context types of similar sites more accurately, such as distinguishing health information sites from adult sites.

After the site content is analyzed to determine the content type, that information may be stored (step not shown). For example, indexer 110 may store the information in identifier table 115. Otherwise, the content is returned by, for example, indexer 110 at step 410.

When the content type is received, the content type is compared to a content policy. For example, receiver 150 may compare content type 230 to content policy 154. Based on that comparison, a link to the content is displayed. For example, receiver 150 may display link 264 based on the comparison. In an example, a user could configure the content policy such that a warning would be displayed if the content type was "adult". Supposing the content type did return as "adult", an "inappropriate" affordance may be displayed with the link. An example of a link with an inappropriate affordance may be found at block 334 of FIG. 3.

In this way, the link is screened automatically based on the content that the link's identifier addresses. The appropriateness of a site's contents is verified before the user selects a link to that site. If the site is inappropriate, the link may be blocked, for example, to protect children from inappropriate links. In addition, the user may receive an indication of the site's contents, informing the user's decision on whether to select the link.

CONCLUSION

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A computer-implemented method for displaying a link to a site addressable by an identifier, comprising:

(a) in response to receipt of a message with the link, displaying the link to the site as deactivated and garbled to prevent copying and pasting the identifier associated with the link into a browser window address field;

(b) after the link is displayed as deactivated and garbled, determining a content type for the site;

(c) displaying, with the deactivated and garbled link, an affordance indicating that the link is being scanned;

(d) determining appropriateness of the site based on the content type determined in (b); and once the site is determined to be appropriate in (d):

(e) activating the link to enable a user to navigate to the site using the link; and (f) ungarbling the link.

2. The method of claim 1, wherein determining the content type occurs on an indexing server.

3. The method of claim 1, wherein determining appropriateness comprises determining the appropriateness of the site based on the content type and a content policy, and wherein displaying the link comprises:

(i) determining a presentation of the link based on a content policy and the content type; and (ii) displaying the link to the site based on the presentation.

4. The method of claim 3, wherein the determining the content type comprises selecting a content type based on the identifier.

5. The method of claim 3, wherein the determining the content type comprises determining the content type based on a content of the site.

6. The method of claim 5, wherein the determining the content type comprises determining the content type using a contextual analysis of the content of the site.

7. The method of claim 5, wherein the determining the content type comprises determining the content type using a keyword search of the content of the site.

8. The method of claim 5, wherein the determining the content type comprises applying a computer vision algorithm to the content of the site.

9. The method of claim 1, wherein the affordance is displayed in (c) while the content type is being determined in (b).

10. A system for displaying a link to a site addressable by an identifier, comprising:

a link displayer that, in response to receipt of a message with the link, displays the link to the site as deactivated and garbled to prevent copying and pasting the identifier associated with the link into a browser window address field;

an indexer that, once the link is displayed as being deactivated and garbled, determines a content type for the site, wherein the link displayer: (i) displays, with the deactivated and garbled link, an affordance indicating the link is being scanned and, (ii) once the indexer determines the content type for the site, activates and ungarbles the link to enable a user to navigate to the site, if the content type determined by the indexer is determined to be appropriate; and at least one computing device that implements the link displayer and indexer.

11. The system of claim 10, wherein the link displayer presents the link according to the content type.

12. The system of claim 11, further comprising a content policy enforcer that determines whether the content type is appropriate based on a content policy and determines how to present the link based on the content policy and the content type.

13. The system of claim 10, further comprising an identifier table that maps a known identifier to a known content type of the site addressable by the known identifier.

14. The system of claim 13, wherein the indexer returns the known content type when the identifier is among the known identifiers in the identifier table.

15. The system of claim 10, wherein the indexer communicates with the site and determines the content type based on a content of the site.

16. The system of claim 15, wherein the indexer determines the content type for the site using a contextual analysis of the content of the site.

17. The system of claim 15, wherein the indexer determines the content type for the site using a keyword search of the content of the site.

18. The system of claim 15, wherein the indexer applies a computer vision algorithm to determine the content type.

19. The system of claim 10, wherein the link displayer displays the affordance while the indexer determines the content type.

* * * * *